US007956118B2

(12) United States Patent
Jin et al.

(10) Patent No.: US 7,956,118 B2

(45) Date of Patent: Jun. 7, 2011

(54) METHOD AND PREPARATION OF CHEMICALLY PREPARED TONERS

(75) Inventors: Xin Jin, Pittsford, NY (US); Cheng Yang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/237,490

(22) Filed: Sep. 25, 2008

(65) Prior Publication Data

US 2010/0075247 A1 Mar. 25, 2010

(51) Int. Cl.
*C08C 1/14* (2006.01)
*G03G 5/00* (2006.01)

(52) U.S. Cl. ..................... 524/492; 430/137.1; 528/488; 528/491

(58) Field of Classification Search .................. 523/333; 524/442, 490, 492, 493; 528/488, 401, 491, 528/497; 430/137.1
See application file for complete search history.

(56) References Cited

U.S. PATENT DOCUMENTS

| | | | | |
|---|---|---|---|---|
| 2,229,513 | A | 1/1941 | Lustig | |
| 3,819,392 | A * | 6/1974 | Weldes et al. | 106/287.11 |
| 3,893,935 | A | 7/1975 | Jadwin et al. | |
| 4,059,553 | A * | 11/1977 | Tohyama et al. | 524/5 |
| 4,079,014 | A | 3/1978 | Burness et al. | |
| 4,160,644 | A | 7/1979 | Ryan | |
| 4,323,634 | A | 4/1982 | Jadwin | |
| RE31,072 | E | 11/1982 | Jadwin et al. | |
| 4,394,430 | A | 7/1983 | Jadwin et al. | |
| 4,414,152 | A | 11/1983 | Santilli et al. | |
| 4,416,965 | A | 11/1983 | Sandhu et al. | |
| 4,624,907 | A | 11/1986 | Niimura et al. | |
| 4,683,188 | A | 7/1987 | Suzuki et al. | |
| 4,780,553 | A | 10/1988 | Suzuki et al. | |
| 4,814,250 | A | 3/1989 | Kwarta et al. | |
| 4,833,060 | A | 5/1989 | Nair et al. | |
| 4,834,920 | A | 5/1989 | Bugner et al. | |
| 4,835,084 | A | 5/1989 | Nair et al. | |
| 4,840,864 | A | 6/1989 | Bugner et al. | |
| 4,965,131 | A | 10/1990 | Nair et al. | |
| 5,133,992 | A | 7/1992 | Nair et al. | |
| 5,283,151 | A | 2/1994 | Santilli | |
| 6,153,356 | A * | 11/2000 | Urano et al. | 430/281.1 |
| 6,294,595 | B1 | 9/2001 | Tyagi et al. | |
| 6,416,921 | B1 | 7/2002 | Wilson et al. | |
| 6,432,598 | B1 * | 8/2002 | Alexandrovich et al. | 430/107.1 |
| 6,482,562 | B2 | 11/2002 | Ezenyilimba et al. | |
| 2004/0265729 | A1 * | 12/2004 | Patel | 430/137.14 |
| 2007/0292800 | A1 * | 12/2007 | Jin et al. | 430/137.1 |
| 2007/0298346 | A1 | 12/2007 | Ezenyilimba et al. | |
| 2008/0145779 | A1 | 6/2008 | Yang et al. | |
| 2008/0145780 | A1 | 6/2008 | Yang et al. | |

FOREIGN PATENT DOCUMENTS

| | | |
|---|---|---|
| GB | 1420839 | 1/1976 |
| GB | 1501065 | 2/1978 |

* cited by examiner

*Primary Examiner* — Vasu Jagannathan
*Assistant Examiner* — Hannah Pak
(74) *Attorney, Agent, or Firm* — Andrew J. Anderson

(57) ABSTRACT

A method of making polymeric particles having a controlled size and size distribution, and in particular a method for the preparation of chemically prepared toners, via evaporative limited coalescence process, wherein basic silicate salts are employed to remove particulate stabilizer from precipitated polymer particles. The process includes the steps of dispersing polymeric binder materials and optional additives in an organic solvent to form an organic phase. The organic phase is dispersed by high shear agitation in an aqueous phase containing a particulate stabilizer, e.g. colloidal silica, to form a dispersion of small droplets of the organic phase in the aqueous phase. The dispersion is homogenized and the organic solvent is removed from the dispersed particles in the dispersion by evaporation, and polymeric particles are precipitated with particulate stabilizer on the surface thereof, which are then recovered, treated with a basic silicate salt to remove particulate stabilizer, and washed and dried.

18 Claims, No Drawings

METHOD AND PREPARATION OF CHEMICALLY PREPARED TONERS

FIELD OF THE INVENTION

This invention relates to a method for the preparation of polymeric powders suitable for use as electrostatographic toner, and more particularly, to a method for the preparation of chemically prepared toners for the application in electrostatographic printing.

BACKGROUND OF THE INVENTION

Electrostatic toner polymer particles can be prepared by a kind of chemically prepared toner process frequently referred to as "limited coalescence". In this process, polymer particles having a narrow size distribution are obtained by forming a solution of a polymer in a solvent that is immiscible with water, dispersing the solution so formed in an aqueous medium containing a solid colloidal stabilizer, e.g. colloidal silica, and removing the solvent by evaporation to obtain polymeric particles. The resultant particles are then isolated, treated with base to remove the solid colloid al stabilizer, washed and dried.

The evaporative limited coalescence offers many advantages over the conventional grinding method of producing toner particles. Toner particles can be prepared by the evaporative limited coalescence technique from any type of binder polymer that is soluble in a solvent that is immiscible with water. The size and size distribution of the resulting polymer particles can be controlled by the relative quantities of the polymer employed, the solvent, the quantity and size of the water-insoluble particulate suspension stabilizer and the size to which the solvent-polymer droplets are reduced by the agitation employed in dispersing the organic solution in the aqueous medium. Representative patents disclosing toner manufacture by limited coalescence and advantages thereof include U.S. Pat. Nos. 4,833,060, 4,835,084, 4,965,131, 5,133,992, 6,294,595 6,416,921 and 6,482,562, each of which is incorporated herein by reference.

Following evaporation of the solvent, the isolated particles are typically treated with basic solution to remove the particle stabilizer, e.g. colloid silica. Generally inorganic bases such as sodium or potassium hydroxide are used in this basic treatment process. The use of such strong bases, however, has been found to detrimentally interact with some of the pigments, additives and even polymeric binders useful in toners, and generate less desirable results when using such toners prepared by such process.

SUMMARY OF THE INVENTION

In one embodiment, the present invention provides a method of making polymeric particles having a controlled size and size distribution, and in particular a method for the preparation of chemically prepared toners, via evaporative limited coalescence process, wherein basic silicate salts are employed to remove particulate stabilizer from precipitated polymer particles. The process includes the steps of dispersing polymeric binder materials colorants and optional additives in an organic solvent to form an organic phase. The organic phase is dispersed by high shear agitation in an aqueous phase containing a particulate stabilizer, e.g. colloidal silica, to form a dispersion of small droplets of the organic phase in the aqueous phase. The dispersion is homogenized and the organic solvent is removed from the dispersed particles in the dispersion by evaporation, and polymeric particles are precipitated with particulate stabilizer on the surface thereof, which are then recovered, treated with a basic silicate salt to remove particulate stabilizer, and washed and dried.

DETAILED DESCRIPTION OF THE INVENTION

The present invention is applicable to the preparation polymeric particles having a controlled size and size distribution, and in particular for the preparation of chemically prepared toners, via evaporative limited coalescence process. The invention applies to the preparation of particles of any type of polymer that is capable of being dissolved in a solvent that is immiscible with water, and includes compositions such as, for example, olefin homopolymers and copolymers, such as, polyethylene, polypropylene, polyisobutylene and polyisopentylene; polytrifluoroolefins; polytetrafluoroethylene and polytrifluorochloroethylene; polyamides, such as poly(hexamethylene adipamide), poly(hexamethylene sebacamide), and polycaprolactam; acrylic resins, such as poly(methyl methacrylate), poly(methyl acrylate), poly(ethyl methacrylate) and poly(styrene-methyl methacrylate); ethylene-methyl acrylate copolymers, ethylene-ethyl acrylate copolymers, ethylene-ethyl methacrylate copolymers, polystyrene and copolymers of styrene with unsaturated monomers, cellulose derivatives, polyesters, polyvinyl resins and ethylene-allyl alcohol copolymers and the like.

The solvents chosen for use in the organic phase steps may be selected from among any of the well-known solvents capable of dissolving polymeric binders and which is also immiscible with water. Typical of the solvents chosen for this purpose are chloroform, chloromethane, dichloromethane, ethyl acetate, propyl acetate, vinyl chloride, methyl ethyl ketone, trichloromethane, carbon tetrachloride, ethylene chloride, trichloroethane, toluene, xylene, cyclohexanone, 2-nitropropane and the like. Particularly useful solvents are ethyl acetate, propyl acetate, and dichloromethane for the reason that they are good solvents for many polymers while at the same time they are immiscible with water. Further, its volatility is such that it is readily removed from the discontinuous phase droplets by evaporation.

The particulate stabilizer selected for use herein may be selected from among highly cross-linked polymeric latex materials of the type described in U.S. Pat. No. 4,965,131 to Nair et al., fumed or colloidal silica (silicon dioxide). Silicon dioxide is preferred. It is generally used in an amount ranging from 1 to 15 parts by weight based on 100 parts by weight of the total solids of the toner employed. The size and concentration of these stabilizers control and predetermine the size of the final toner particles. In other words, the smaller the size and/or the higher the concentration of such particles, the smaller the size of the final toner particles.

A promoter that is water soluble and affects the hydrophilic/hydrophobic balance of the solid dispersing agent in the aqueous solution may also be employed in order to drive the solid dispersing agent, that is, the particulate stabilizer, to the polymer/solvent droplet-water interface. Typical of such promoters are sulfonated polystyrenes, alginates, carboxymethylcellulose, tetramethyl ammonium hydroxide or chloride, diethylaminoethyl methacrylate, water soluble complex resinous amine condensation products of ethylene oxide, urea and formaldehyde and polyethyleneimine. Also effective for this purpose are gelatin, casein, albumin, gluten and the like or non-ionic materials such as methoxycellulose. The promoter is generally used in an amount from about 0.2 to about 0.6 parts per 100 parts, by weight, of aqueous solution.

Various additives generally present in electrostatographic toner may be added to the polymer prior to dissolution in the solvent or in the dissolution step itself, such as colorants, charge control agents, waxes and lubricants.

Colorants, a pigment or dye, suitable for use in the practice of the present invention are disclosed, for example, in U.S. Reissue Pat. 31,072 and in U.S. Pat. Nos. 4,160,644; 4,416,965; 4,414,152; and 2,229,513. Colorants are generally employed in the range of from about 1 to about 30 weight percent on a total toner powder weight basis, and preferably in the range of about 2 to about 20 weight percent. Mixtures of colorants can also be used. Colorants in any form such as dry powder, its aqueous dispersions or wet cake can be used in the present invention.

The term "charge control" refers to a propensity of a toner addendum to modify the triboelectric charging properties of the resulting toner. A very wide variety of charge control agents for positive charging toners are available. A large, but lesser number of charge control agents for negative charging toners is also available. Suitable charge control agents are disclosed, for example, in U.S. Pat. Nos. 3,893,935 and 4,323,634 to Jadwin et al. and U.S. Pat. No. 4,079,014 to Burness et al., and British Patent No. 1,420,839 to Eastman Kodak. Charge control agents are generally employed in small quantities such as from about 0.01 to 10 parts per hundred by weight based upon the weight of the total solids content (weight of the toner) and preferably from about 0.2 to about 3.0 parts per hundred. Additional charge control agents which are useful are described in U.S. Pat. Nos. 4,394,430; 4,624,907; 4,814,250; 4,840,864; 4,834,920; 4,683,188 and 4,780,553 and British Patent 1,501,065. Mixtures of charge control agents can also be used.

In accordance with one embodiment, a pigment dispersion may be prepared by conventional techniques as, for example, by media milling, melt dispersion and the like. The pigment dispersion, polymer material, a solvent, and optionally a charge control agent are combined to form an organic phase. This mixture may be permitted to stir overnight and is then dispersed in an aqueous phase comprising a particulate stabilizer and optionally a promoter. The resultant mixture is then subjected to mixing and homogenization by high shear agitation. In this process, the particulate stabilizer forms an interface between the organic globules in the organic phase. Due to the high surface area associated with small particles, the coverage by the particulate stabilizer is not complete. Coalescence continues until the surface is completely covered by particulate stabilizer. Thereafter, no further growth of the particles occurs. Accordingly, the amount of the particulate stabilizer is inversely proportional to the size of the toner obtained. The relationship between the aqueous phase and the organic phase, by volume may typically range from 1:1 to approximately 9:1. This indicates that the organic phase is typically present in an amount from about 10% to 50% of the total homogenized volume.

Following the homogenization treatment and optionally the introduction of chemicals to adjust the shape and morphology of toner particles, the solvent present is evaporated and the isolated particles are treated with basic solution to remove the particle stabilizer, e.g. colloid silica. Generally inorganic bases such as sodium and potassium hydroxide have been used in this basic treatment process. However, it has been found that some of the pigments, additives and even polymeric binders useful in toners can interact with strong inorganic bases and generate less desirable results. One example is the isoindoline type yellow pigment 185 (PY185), 2-Cyano-2-(2,3-dihydro-3-(tetrahydro-2,4,6-trioxo-5(2H)-pyrimidinylidene)-1H-isoindol-1-ylidene)-N-methylacetamide, which is soluble in strong inorganic bases, such as sodium and potassium hydroxide. Part of the pigment in toners with PY 185 may be washed out of the polymer during the basic treatment and into the aqueous phase. Such washout can decrease the color density of the resulting toner particles, and also contaminates the aqueous washing solution generated from the base treatment process. In the present invention organic and/or metallic basic silicate salt materials are employed in the base treatment process to minimize the interaction among bases and toner components, including but not limiting binder resins and pigments.

Basic silicate salt materials are comprised of a metallic or an organic cation and a mix of silicate anions. A shorthand method of representing such silicates uses the ratio of $SiO_2$ and $M_2O$ as $xSiO_2:M_2O$, where M is an alkali metal, such as sodium or potassium, or an organic cation, such as a tetraalkylammonium cation, and x represents the molar ratio of silicon oxide to metal oxide. Solutions of soluble silicates exhibit an alkalinity, which may be readily adjusted and/or controlled by varying the silicon oxide to metal oxide ratio.

The organic and metallic silicate salts may include, but are not limited to, quaternary ammonium silicates, such as tetramethylammonium silicate; metallic silicates, such as sodium silicate, potassium silicate, lithium silicate and ammonium silicate; and metallic metasilicates, such as sodium metasilicate, potassium metasilicate, lithium metasilicate and ammonium metasilicate. Preferred silicates include tetramethylammonium silicate, sodium silicate and potassium silicate.

Such organic basic silicate materials, metallic silicates and metallic metasilicates may be used alone or in combination. Silica removal performance and reactivity to pigments of metallic silicates may be readily controlled by adjusting molar ratio of silicon oxide ($SiO_2$) and metal oxide ($M_2O$). The $SiO_2:M_2O$ molar ratio of organic and metallic silicate salts may be readily adjusted and/or controlled by mixing the silicates with a percentage of the corresponding organic or metallic hydroxide compounds, including, but not limited to quaternary ammonium hydroxides, such as tetramethylammonium hydroxide, tetraethylammonium hydroxide, tetrapropylammonium hydroxide, and tetrabutylammonium hydroxide, benzyltrimethylhydroxide, trimethylethanolammonium hydroxide, and methyltriethanolammonium hydroxide; and metallic hydroxides such as sodium hydroxide and potassium hydroxide. The pH of silicate solutions may be varied from less than 10.5 of high ratio silicates to above 13.5 of low ratio ones by adjusting the molar ratio of the silicon oxide to the metal oxide. From the aspects of maximizing the silica removal performance and minimizing the reactivity with pigments and binder resins, it is preferably to control the pH in the range of 11 to 13, and more preferably in the range of 11.5 to 12.5. From the aspects of maximizing the silica removal performance and minimizing the reactivity of pigments and binder resins, and the aspect of ease in waste stream management, the concentration of the organic basic materials, and/or the metallic silicates including metasilicates in the alkaline solution is preferably in the range of 1 to 20% by weight, and more preferably in the range of 5 to 12% by weight.

Pigments suitable for use in the practice of the present invention should be capable of being dispersed in the polymer, insoluble in water and yield strong permanent color. Typical of such pigments are the organic pigments such as phthalocyanines, lithols and the like and inorganic pigments such as $TiO_2$, carbon black and the like. Typical of the phthalocyanine pigments are copper phthalocyanine, a mono-chlor copper phthalocyanine, and hexadecachlor copper phthalocyanine. Other organic pigments suitable for use herein include anthraquinone vat pigments such as vat yellow 6GLCL1127, quinone yellow 18-1, isoindoline yellow 185, indanthrone CL1106, pyranthrone CL1096, brominated pyranthrones such as dibromopyranthrone, vat brilliant orange RK, anthramide brown CL1151, dibenzanthrone green CL1101, flavanthrone yellow CL1118, azo pigments such as toluidine red C169 and hansa yellow; and metallized pigments such as azo yellow and permanent red. The carbon black may be any of the known types such as channel black, furnace black, acetylene black, thermal black, lamp black and aniline black. The pigments are typically employed in an amount sufficient to give a content thereof in the toner from about 1% to 40%, by weight, based upon the weight of the toner, and preferably within the range of 4% to 20%, by weight.

The shape of the toner particles has a bearing on the electrostatic toner transfer and cleaning properties. Thus, for example, the transfer and cleaning efficiency of toner particles have been found to improve as the sphericity of the particles are reduced. A number of procedures to control the shape of toner particles are know in the art. In the practice of this invention, additives may be employed in the aqueous phase or in the oil phase if necessary. The additives may be added after or prior to forming the oil-in-water emulsion. In either case, the interfacial tension is modified as the solvent is removed resulting in a reduction in sphericity of the particles. U.S. Pat. No. 5,283,151 describes the use of carnauba wax to achieve a reduction in sphericity of the particles. US 2008/0145779 describes the use of certain metal carbamates that are useful to control sphericity and US 2008/0145780 describes the use of specific salts to control sphericity. US 2007/0298346 describes the use of quaternary ammonium tetraphenylborate salts to control sphericity. These patents and applications are incorporated by reference herein.

The invention will be more fully understood by reference to the following exemplary embodiment, which is set forth solely for purposes of exposition and is not to be construed as limiting. Unless otherwise indicated all percentages are by weight.

EXAMPLES OF THE INVENTION

The invention is demonstrated by the following examples.

Comparative Example 1

An aqueous mixture was prepared by mixing 140 grams of distilled water, 7.5 grams of Nalco™ 1060 (50% solid), which is a sodium stabilized silica suspension by the Nalco Chemical Company, 1.9 grams of a 10 percent solution of poly(adipic acid-co-methylaminoethanol) and 1.3 grams of potassium phthalate. An organic solution was made by mixing 80.4 grams of ethyl acetate, 12.9 grams of Kao N, which is a polyester resin obtained from Kao Corporation, Japan, 1.6 grams of SC-371, a yellow pigment containing 40% of isoindoline yellow 185 obtained from Sun Chemical and 5.2 grams of wax dispersion in ethyl acetate containing 25% of WEC-3, a ester wax from NOF Corporation, Japan, and 80 grams of ethyl acetate. The organic solution and aqueous phase were then mixed together and sheared by using a Silverson mixer followed by a Microfluidizer unit sold from Microfluidics operating at 275 kPa. The white emulsion was then heated up to 50° C. under vacuum for about 30 minutes, during which the organic solvent, ethyl acetate evaporated from the mixture and the organic emulsion then became solid particles. The solid particle dispersion was mixed with 100 grams of 1.0N sodium hydroxide solution for 30 minutes to remove the colloidal silica from particle surfaces. The pH of the mixture is 13.0 upon mixing. The particles were then filtered, washed with water and dried in a vacuum oven at 40° C. overnight. The collected toner particles were characterized using either a Coulter Particle Analyser or a Sysmex FPIA-3000, an image based automated particle shape and size analyzer from Malvern Instruments. The volume and number median values from the Coulter measurements were used to assess the particle size distribution and the volume median value was used to represent the particle size of the particles described in these examples. The toner particles have number average diameter of 6.1 micron and volume average diameter of 8.5 micron. The toner particles were found to contain less than 0.7% of residual silica by emission spectrophotometry measurement.

The tinctorial strength of the yellow toners was evaluated as a "covering power" value. A series of patches of varying density of toner was prepared on clear film; the weight of toner in each patch and area of each patch was measured. The patches were then fused in an oven controlled at a temperature hot enough such that a continuous thin film of toner resulted. The transmission densities of the resulting patches were measured with a Status A blue filter on an X-Rite densitometer. A straight line was drawn through the data for each toner, and the weight per unit area of toner was then calculated at a transmission density of 1.0. The reciprocal of this value, in units of square centimeters per gram, is defined as the covering power (the area covered to a transmission density of 1.0 by one gram of toner). As the covering power increases, the "yield" of the toner increases, that is, less mass is need to create the same amount of density*area coverage in a print. The covering power of the yellow toner in this example is 400 $cm^2/g$.

Comparative Example 2

The procedure and formulations of Comparative Example 1 were repeated except that the solid particle dispersion was mixed with 10 grams of 1.0N sodium hydroxide solution for 30 minutes to remove the colloidal silica from particle surfaces. The pH of the mixture is 11.5 upon mixing. The particles were then filtered, washed with water and dried in a vacuum oven at 40° C. overnight. The toner particles have number average diameter of 6.1 micron and volume average diameter of 8.5 micron. The toner particles were found to contain less than 0.7% of residual silica by emission spectrophotometry measurement. The covering power of the yellow toner in this example is 1000 $cm^2/g$.

Example 1

The procedure and formulations of Comparative Example 1 were repeated except that the solid particle dispersion was mixed with 100 grams of 9% sodium silicate solution in water (in place of the sodium hydroxide solution) for 30 minutes to remove the colloidal silica from particle surfaces. The pH of the mixture is 11.6 upon mixing. The particles were then filtered, washed with water and dried in a vacuum oven at 40° C. overnight. The toner particles have number average diameter of 6.0 micron and volume average diameter of 8.2 micron. The toner particles were found to contain less than 0.7% of residual silica by emission spectrophotometry measurement. The covering power of the yellow toner in this example is 1300 $cm^2/g$.

Example 2

The procedure and formulations of Example 1 were repeated except that the solid particle dispersion was mixed with 100 grams of 10% tetramethylammonium silicate (TMAS) (in place of the sodium silicate solution) for 30 minutes after the organic solvent evaporated. The pH of the mixture is 12.1 upon mixing. The particles were then filtered, washed with water and dried in a vacuum oven at 40° C. overnight. The toner particles have number average diameter of 6.1 micron and volume average diameter of 8.1 micron. The toner particles were found to contain less than 0.7% of residual silica by emission spectrophotometry measurement. The covering power of the yellow toner in this example is 1200 $cm^2/g$.

Example 3

Polyester binder resins, KAO N, KAO Tuftone NE303 and KAO Tuftone LLT-101, supplied by KAO Chemicals were ground to 8-10 μm. 5 g each of ground resin particles were then treated separately by 100 mL of 1N KOH, 1N Star™ Sodium Silicate, and 10% tetramethylammonium silicate (TMAS) for 18 hours under stirring. The treated resin particles were filtered, washed with water and dried in a vacuum oven at 40° C. overnight. Molecular weights of resins before and after treatment were characterized by size-exclusion chromatography (SEC) at 35.0° C. in tetrahydrofuran (THF). The column set consists of three TOSOH Bioscience 7.8 mm×300 mm TSKgel $GMH_{XL}$-HT columns, calibrated with narrow-molecular-weight distribution standards.

As evident from the data listed in Table 1, KOH causes more significant reduction in molecular weight, i.e., more severe degradation of binder resins, than Star™ Sodium Silicate and TMAS do under similar conditions.

TABLE 1

| | Mw | | |
|---|---|---|---|
| | KAO N | Tuftone NE-303 | Tuftone LLT-101 |
| Before Treatment | $3.54 \times 10^6$ | $1.23 \times 10^4$ | $8.69 \times 10^3$ |
| 1N KOH, 18 hours | $2.91 \times 10^6$ | $0.95 \times 10^4$ | $8.57 \times 10^3$ |
| 1N Star ™ Sodium Silicate, 18 hours | $3.13 \times 10^6$ | $1.23 \times 10^4$ | $8.66 \times 10^3$ |
| 10% TMAS, 18 hours | $3.34 \times 10^6$ | $1.22 \times 10^4$ | $8.64 \times 10^3$ |

What is claimed is:

1. A method for making polymeric particles having a controlled size and size distribution which comprises:
   - dissolving a polymer material in an organic solvent to form an organic phase, said solvent being immiscible with water;
   - forming a dispersion of small droplets of said organic phase in an aqueous phase containing a particulate stabilizer by high shear agitation;
   - evaporating the organic solvent to obtain precipitated polymeric particles with particulate stabilizer on the surface thereof; and
   - treating the obtained precipitated polymeric particles with a basic silicate salt solution at a pH of from 11 to 13 to remove particulate stabilizer from the precipitated polymeric particles.

2. The method of claim 1 wherein the particulate stabilizer comprises colloidal silica.

3. The method of claim 1 wherein the basic silicate salt comprises a quaternary ammonium silicate.

4. The method of claim 3 wherein the basic silicate salt comprises tetramethylammonium silicate.

5. The method of claim 1 wherein the basic silicate salt comprises a metallic silicate.

6. The method of claim 5 wherein the basic silicate salt comprises a sodium silicate or potassium silicate.

7. The method of claim 5 wherein the basic silicate salt comprises sodium silicate.

8. The method of claim 1 wherein the precipitated polymeric particles are treated with a basic silicate salt solution at a pH of from 11.5 to 12.5 to remove particulate stabilizer.

9. The method of claim 5 wherein the droplets of polymer and solvent contain a coloring agent.

10. The method of claim 9 wherein the coloring agent comprises a pigment.

11. The method of claim 10 wherein the coloring agent comprises an isoindoline type pigment.

12. The method of claim 11 wherein the pigment comprises PY 185.

13. The method of claim 1 wherein the droplets of polymer and solvent contain a charge control agent.

14. The method of claim 1 wherein the droplets of polymer and solvent contain a wax.

15. The method of claim 1 wherein the solvent comprises chloromethane, dichloromethane, ethyl acetate, propyl acetate, vinyl chloride, MEK, trichloromethane, carbon tetrachloride, ethylene chloride, trichloroethane, toluene, xylene, cyclohexanone, or 2-nitropropane.

16. The method of claim 1 wherein the solvent comprises ethyl acetate.

17. The method of claim 1 wherein the polymer comprises an olefin homopolymer or copolymers, a polyamide, an acrylic resin, polystyrene or a copolymer of styrene with unsaturated monomers, a cellulose derivative, a polyester, a polyvinyl resin, or an ethylene-allyl alcohol copolymer.

18. The method of claim 1 wherein the polymer comprises a polyester.

* * * * *

UNITED STATES PATENT AND TRADEMARK OFFICE

CERTIFICATE OF CORRECTION

PATENT NO. : 7,956,118 B2
APPLICATION NO. : 12/237490
DATED : June 7, 2011
INVENTOR(S) : Jin et al.

It is certified that error appears in the above-identified patent and that said Letters Patent is hereby corrected as shown below:

| **Column** | **Line** | |
|---|---|---|
| 8 | 24 | Change the dependency of claim 9 from "claim 5" to -- claim 1 --. |

Signed and Sealed this
Twenty-fourth Day of April, 2012

David J. Kappos
*Director of the United States Patent and Trademark Office*